D. R. YARNALL.
SENSITIVE WEIR METER INLET CONTROL.
APPLICATION FILED MAR. 28, 1916.
1,307,609.
Patented June 24, 1919.
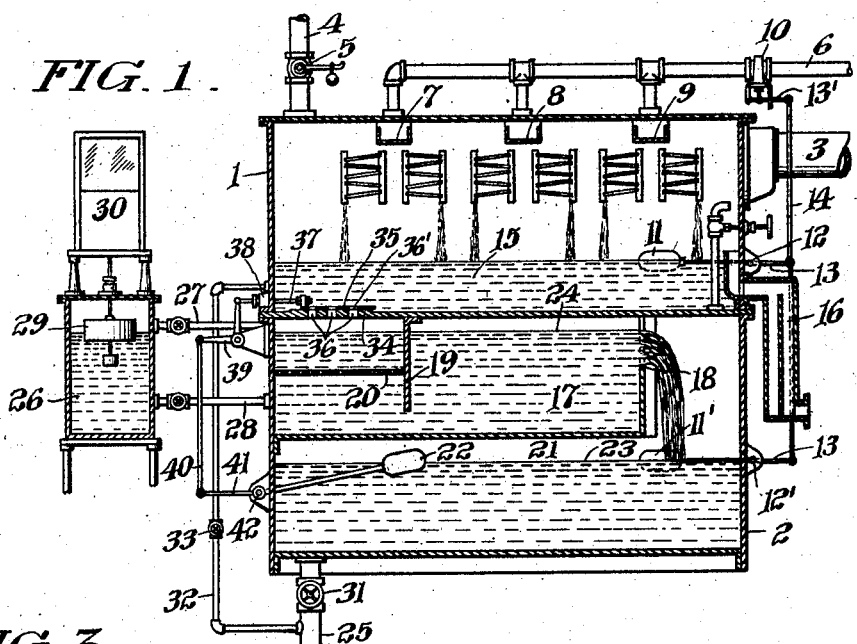
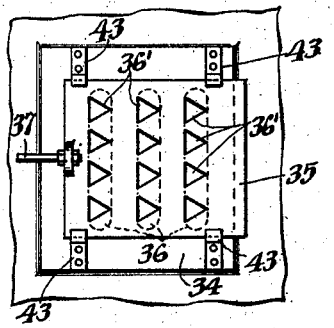
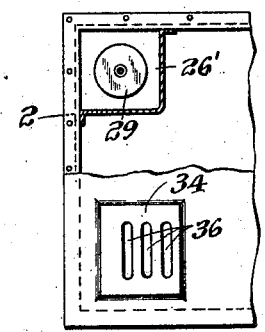
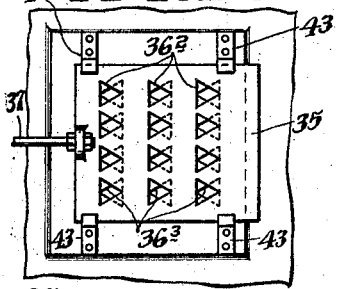

UNITED STATES PATENT OFFICE.

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

SENSITIVE WEIR-METER INLET CONTROL.

1,307,609.     Specification of Letters Patent.     Patented June 24, 1919.

Application filed March 28, 1916. Serial No. 87,362.

*To all whom it may concern:*

Be it known that I, DAVID ROBERT YARNALL, a citizen of the United States, residing at 316 Preston St., Philadelphia, in the county of Philadelphia and State of Pennsylvania, have invented a certain new and useful Sensitive Weir-Meter Inlet Control, of which the following is a specification.

The purpose of my invention is to make more sensitive the control of inlet water to a weir meter governed by height of catch basin level within the meter.

A further purpose of my invention is to form the valve directly in or upon the partition separating the meter and heater.

A further purpose of my invention is to progressively increase the rate of opening of the inlet valve to a weir meter with downward movement of a controlling float.

Further purposes of my invention are disclosed in the specification and claims.

I have preferred to illustrate my invention by but a few of the many forms in which it may appear, selecting some which are practical, efficient and easily manufactured and which at the same time well illustrate the principles of my invention.

Figure 1 is a vertical section taken longitudinally through a weir meter, superimposed feed water heater, grid valve control therebetween, and appurtenances illustrating my invention.

Fig. 2 is a top plan view, partly broken, showing the meter construction and valve, modified to show a different location of the float chamber from that seen in Fig. 1.

Figs. 3 and 4 are fragmentary top plan views showing modified forms of grid valves which may be used.

In the drawings similar numerals of reference indicate like parts.

As weir meters find their largest use at the present time in determination of the efficiency of the various parts of steam plants, every advance in accuracy in the meter is much sought.

Within the range of reasonable capacity for storage of water back of the weir chamber it is quite desirable to average the flow, backing up in this storage during times of excessive feed to the heater and drawing upon this reserve to take care of periods of reduced supply to the heater. This improves the accuracy of the meter by reducing the fluctuation of the surface level and equalizes the head upon the pump and the supply for the pump.

Previous to my invention there has been an unnecessarily large fluctuation of the rate of flow because too large a rise or drop in the catch basin water level was required before the inlet valve acted to the extent desired and because the rate of increase or reduction of flow was approximately the same when the catch basin water level was at its extremes of fluctuation as at its middle position, notwithstanding the desirability of relatively slower opening and quicker closing of the inlet, as evidenced by the height of this level. My invention is directed to overcoming this defect in previous controls.

Taking up first the embodiment shown in Fig. 1:—The feed water heater 1 is superimposed above the weir meter 2 and receives its exhaust steam at 3. The exhaust outlet is shown at 4, controlled by a weighted outlet valve at 5. The make-up water enters through pipe 6, being distributed at three points 7, 8 and 9 and the quantity of make-up water admitted is controlled by valve 10 through float 11, a rock shaft 12, having water-tight bearings in a swelled portion of the casing, rock arm 13 on one end of the shaft, rod 14 and arm 13' connected to the valve stem.

The water 15, accumulating within the bottom of the heater chamber, forms a pool for equalization of flow of water through the weir and is protected from excessive height by overflow 16.

In the weir meter the weir chamber 17 is provided with weir 18, approach baffle 19 and screen 20. The catch basin chamber 21 contains a controlling float 22 whose height varies with the water level 23 which is a function of the weir chamber rate of admission affecting the level 24, and of the rate of pump withdrawal through outlet 25. The float chamber 26 is located outside of the weir casing in the illustration and is connected with it by pipes 27 and 28 respectively above and below the water level in the weir chamber. Float 29 operates any suitable measuring mechanism shown conventionally at 30.

A float 11' in the catch basin may also be connected with the make-up water valve 10 so that sticking of the float 11 will be relieved by the early similar strain through float 11'. This float 11' is shown as connected with rod 14 by the same form of rock shaft 12', rock arm 13 and rod 14.

The catch basin outlet 25 is valved at 31 and is connected with the bottom of the heater chamber by a by-pass 32, valved at 33, for convenience in case it be desired to cut out the weir chamber temporarily.

Whatever the form of valve used by me I prefer to mount it in or directly upon the division plate between the meter and the heater in order that there may be as direct connection and as little fluid resistance as possible.

In this figure, 1, I show one form of valve, a "grid" adapted to reduce the range of fluctuation of the catch basin water level, required to accomplish regulation of the inlet valve, (i. e., to make the control more sensitive and more quickly effective). It comprises a valve seat 34 and valve 35, each slotted transversely to the direction of movement of the valve and in general contour as seen at 36, in Fig. 2, so that movement of the valve opens and closes all of the openings in the seat at the same time. The valve is here shown as horizontal merely because this is its more convenient location in the assemblage shown. It is operated by stem 37 passing through a gland 38 and moved by a bell crank 39 and transmission rod 40 from an arm 41 connected by a rock shaft and arms with the float 22. It is protected against leakage as in the case of the connections for floats 11 and 11'. The parts are bushed in any suitable way where the connection passes through the tank, as at 42. Guides, conventionally shown at 43 in Figs. 3 and 4, are used in the form shown in Figs. 1 and 2.

In the form shown in Fig. 2, the float chamber 26' is placed in one corner of the weir chamber at a distance horizontally from the inlet valve and protected by baffles from direct water fluctuation therebetween.

In the form shown in Fig. 3, the valve is of the grid form and the seat is the same as in Figs. 1 and 2, but the openings in the valve are larger in number than in the seat. They are formed by a series of triangular perforations 36', arranged in groups corresponding to the slots of the valve seat and shown in full open position at the point of greatest movement of the valve toward the right.

It will be seen that the opening of the valve in this form is gradual, corresponding with the exposure of the apex of the triangle and that the straight sides may be departed from, if desired, the opening in every case increasing in extent at a rate dependent upon the character of contour of the apertures. With the triangles shown, there will be a regular rate of increase becoming a maximum in the position shown.

With this form of valve there is but slight change of flow within normal range of fluctuation of the surface 23, but speedy relief is obtained when the demands of the pump unduly lower the catch basin water level.

In the form shown in Fig. 4 both the valve and valve seat have series of apertures arranged in transversely directed lines. I show the apertures of the valve at $36^2$ and those of the seat at $36^3$. Both apertures are triangular, as illustrated, but the triangles are reversely placed so that their apexes come into register (though reversely placed) with the beginning of opening movement of the valve and the apex of each lies over the base of the other at the point of greatest opening, as shown, for the intended extent of movement. Further extent of movement would require greater longitudinal spacing of the rows of opening than is indicated. In the illustration, the valve is at its point of greatest movement to the right. Obviously, the rate of increase of opening is much more rapid with this form than with the form shown in Fig. 3. It will be evident that the rate of opening may thus be made to increase or decrease, as preferred, with continued opening movement of the valve and that the extent of change may be controlled by the contour of the valve and valve seat openings.

It will be evident that I can secure direct flow of water between the heater and the meter chamber, without obstruction by channels or pipes and that I can regulate with a minimum of valve movement and consequently a minimum of catch basin level fluctuation between the positions of total opening and of total closing of the valve, that I can adjust the rate of opening of the valve to secure gradual or quick opening, as desired and that the catch basin reserve may be additionally protected against excessive low levels by increasing the rate of valve opening with continued opening movement of the valve.

It will be evident that my invention may be utilized with various types of heater and of weir meter and that those shown were selected for purposes of illustration only.

Having thus described my invention, what I claim as new and desire to secure by Letters Patent is:—

1. In a device of the character stated, a weir meter comprising a weir chamber and a catch basin, having water inlet to the weir chamber and outlet from the catch basin, a float in the catch basin, a grid valve in the inlet to the weir chamber having varied rate of change of opening with increased opening movement and connections between the grid valve and float, opening the valve with downward movement of the float and closing it with upward movement thereof.

2. In a device of the character stated, a weir meter comprising a weir chamber and a catch basin and having water inlet to the weir chamber, a float in the catch basin, a grid valve seat having slots therein, a valve having a plurality of openings adapted to be moved over each slot of the seat and during their movement transversely to the length of the slot presenting different widths of opening above the slot, measured in a direction parallel to the slot length, in combination with connections between the valve and the float.

3. In a device of the character stated, a weir meter comprising a weir chamber and a catch basin and having water inlet to the weir chamber, a float in the catch basin, a grid valve seat having openings therein, a valve having openings therein adapted to be moved over the openings of the seat and one of the parts having a plurality of openings arranged transversely to the direction of valve movement, presenting different widths of opening over the openings in the other part, in combination with connections between the valve and the float.

4. In a device of the character stated, a weir meter comprising a weir chamber and a catch basin and having water inlet to the weir chamber, a float in the catch basin, a grid valve seat in the inlet having an opening therein, a valve having a plurality of openings arranged in a row transverse to the direction of valve movement, adapted to be moved over the opening of the seat and with valve movement presenting different widths of opening for liquid passage in combination with connections between the valve and the float.

DAVID ROBERT YARNALL.

Witnesses:
JOSEPH KILDARE,
E. K. SHELLY.

Copies of this patent may be obtained for five cents each, by addressing the "Commissioner of Patents, Washington, D. C."